Dec. 16, 1930.  H. W. ABEL  1,785,664
ANIMAL TRAP
Filed Oct. 16, 1929  2 Sheets-Sheet 2
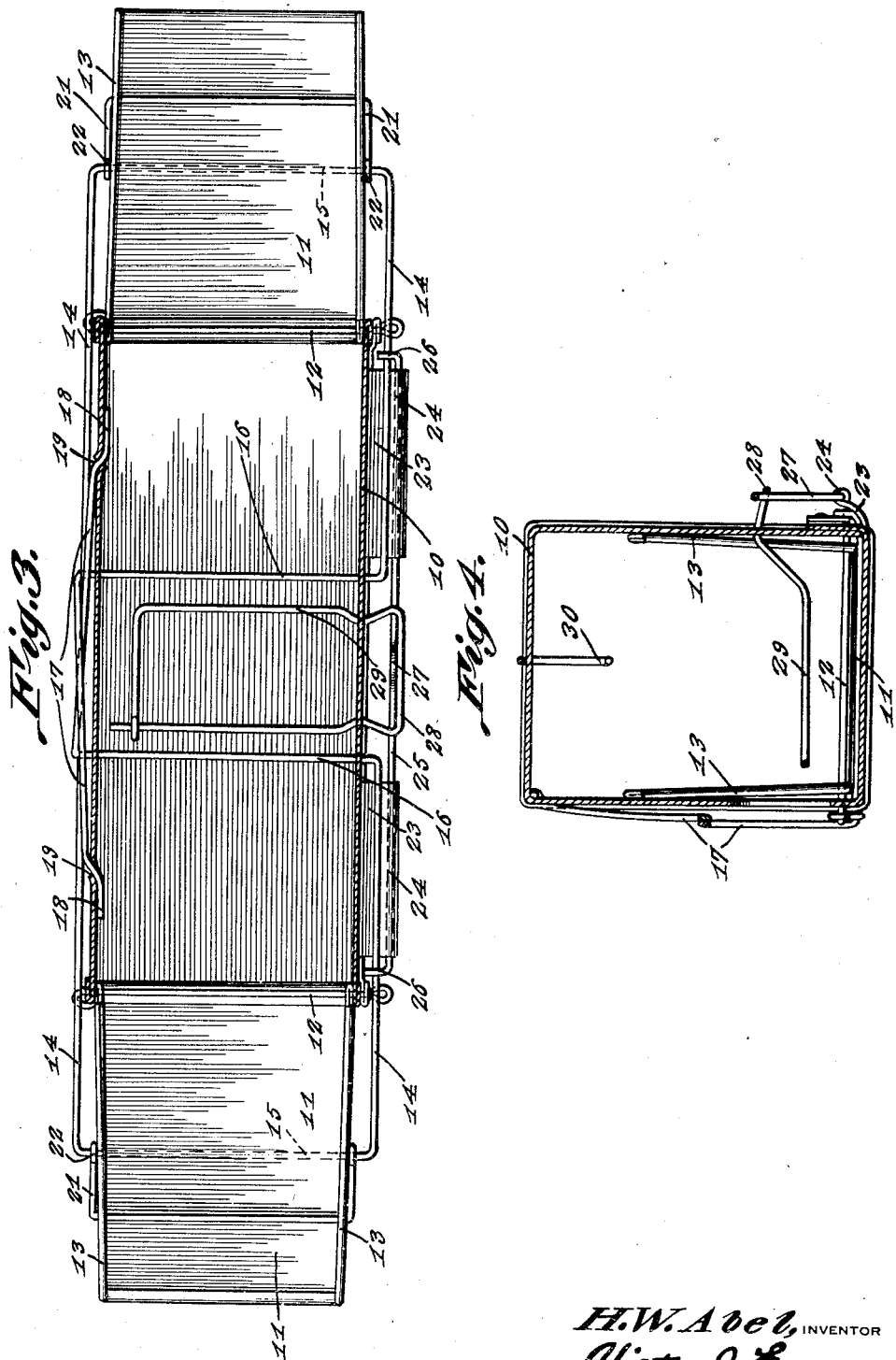
H. W. Abel, INVENTOR
BY Victor J. Evans
ATTORNEY Patented Dec. 16, 1930

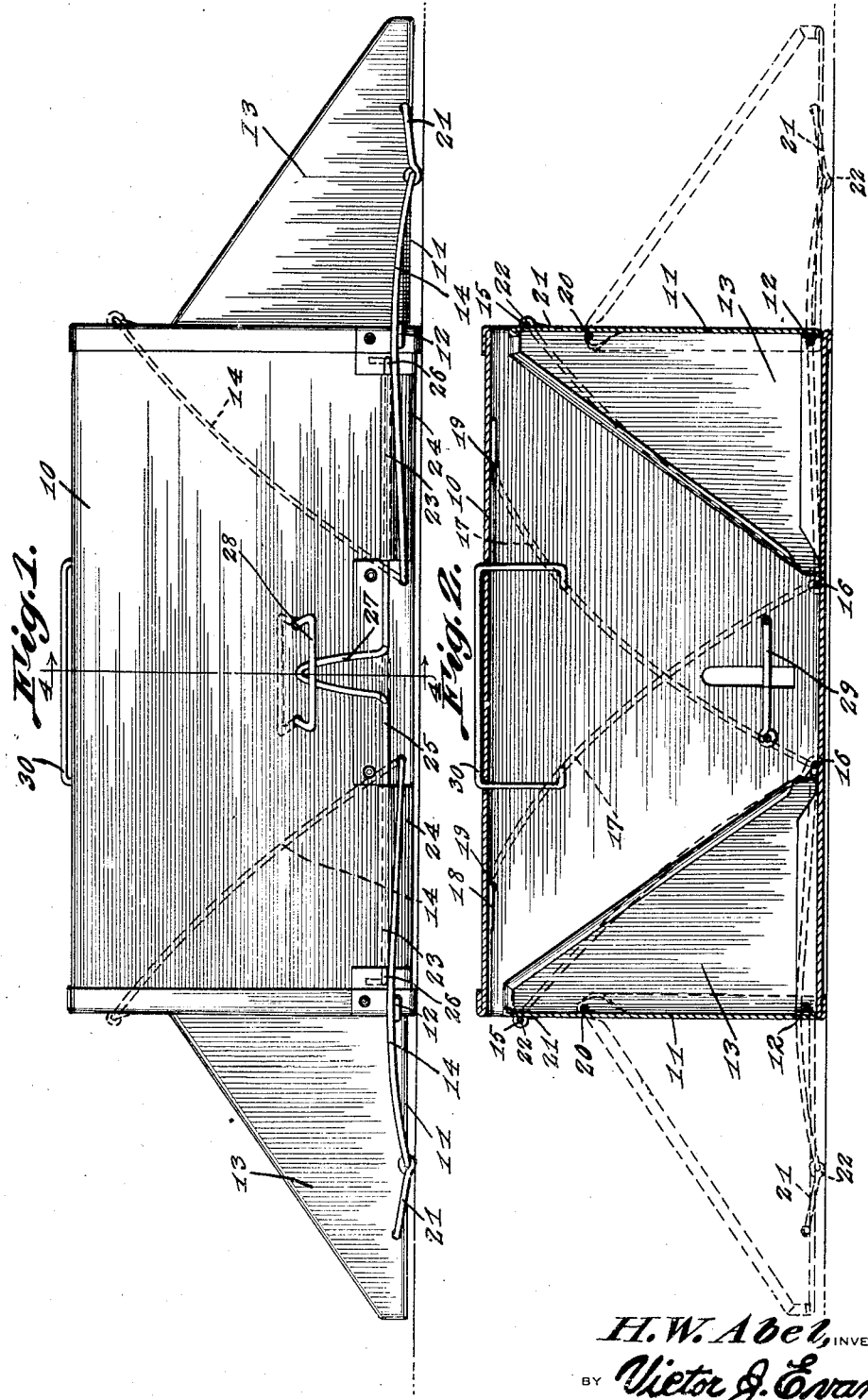

1,785,664

UNITED STATES PATENT OFFICE

HENRY W. ABEL, OF BRILLION, WISCONSIN

ANIMAL TRAP

Application filed October 16, 1929. Serial No. 400,050.

This invention relates to animal traps for capturing animals alive, and is an improvement upon the trap disclosed in Patent No. 1,722,879, granted to me July 30, 1929.

An object of the present invention is to provide and simplify the trap, and at the same time provide a trap which is positive and reliable in action, and which will capture animals in a humane manner, without injury to the fur.

Another object of the invention is to provide novel means for closing the trap and holding the same closed against pressure from within to prevent the escape of captured animals, but which will permit the door to be readily opened from the outside.

A further object of the invention is the provision of novel trigger and bait mechanisms to hold the door in open position, the mechanism referred to being sensitive to the touch of an animal within the trap so that the door will be readily closed.

With the above and other objects in view, the invention further includes the following novel features and details of construction, to be hereinafter more fully described, illustrated in the accompanying drawings and pointed out in the appended claims.

In the drawings:—

Figure 1 is a side elevation of a trap constructed in accordance with the invention and shown in "set" position.

Figure 2 is a longitudinal vertical sectional view of the same, the full lines showing the trap in "sprung" or closed position, while the open position of the trap is shown by dotted lines.

Figure 3 is a horizontal sectional view with the parts in the position shown in Figure 1.

Figure 4 is a sectional view on the line 4—4 of Figure 1.

Referring to the drawings in detail wherein like characters of reference denote corresponding parts, the reference character 10 indicates a housing which forms the body of the trap and which is rectangular in shape. This housing is open at each end and these open ends are adapted to be closed by doors 11. The doors have their lower ends hingedly secured within the openings upon hinge bars 12 and their side edges are provided with wings 13 so as to guide an animal into the trap when the doors are open.

Spring bails are provided to close and hold the doors in closed position. These bails are substantially U-shaped and include parallel arms 14 which are connected by a bar 15, the latter extending across the door adjacent the top thereof. The doors and bails are duplicated at each end of the housing and the arms 14 of the bails extend downward and inward when the doors are in closed position, as shown by the dotted lines in Figures 1 and 2 of the drawings.

One arm of the bail is provided with a right angled extension 16 which extends transversely through the housing near the bottom of the latter, and an arm 17 which forms a continuation of the extension 16 is disposed upwardly and outwardly upon the outside of the housing and has its extremity 18 passed through an opening 19 provided in the housing. This arm 17 provides an anchoring arm and serves to permit the arms 14 to be placed under tension when the door is opened.

Extending through the side wings 13 of each of the doors 11 is a bar 20. The opposite ends of this bar are right angularly arranged to provide arms 21 whose outer extremities carry eyes 22 for pivotal connection with the cross bar 15 of the bail. By reference to Figure 2 of the drawings it will be seen that when the doors 11 are closed, the cross bars 15 of the bails will be positioned above the bars 20, and in order to open the door it is first necessary to swing the cross bars 15 of the bail downward to a horizontal plane of the bars 20. Any attempt to open the door 11 by pressure from within will cause the door to engage the cross bar 15 so that opening movement will be resisted. The door may thus readily be opened from the outside, but pressure from the inside will be resisted.

Extending laterally from one side of the housing are plates 23 which carry at their outer edges bearings 24 for a trigger bar 25. This bar is rockably mounted in the bearings 24 and carries at each end a right angularly arranged finger 26. This bar is adapted to be engaged by a loop 28 which extends through openings provided in the side wall of the housing. The inner portion 29 of this loop provides a bait holder, so that an animal entering the trap will press upon the bait holder in his attempt to obtain the bait. This pressure will force the outer end of loop 28 upward to release the arm 27, so that the bar 25 will be rocked under the spring tension of the bails and the doors will be automatically closed.

The housing or body 10 is preferably provided with a handle or bail 30 which is slidable within the top of the housing and provides convenient means for carrying the trap.

The invention is susceptible of various changes in its form, proportions and minor details of construction and the right is herein reserved to make such changes as properly fall within the scope of the appended claims.

Having described the invention what is claimed is:—

1. In an animal trap, a housing open at one end, a door hinged at one edge of the opening, a spring bail extending transversely of the door and having its ends operatively connected with the housing, means connecting the bail with the door to yieldingly hold the door closed, a trigger operatively mounted upon the housing, means carried by the trigger to engage the bail and hold the door in open position, and a bait holder adapted to be removably engaged with the trigger to hold the latter in bail engaging position.

2. In an animal trap, a housing open at one end, a door hinged at one edge of the opening, a spring bail extending transversely of the door and having its ends operatively connected with the housing, means connecting the bail with the door to yieldingly hold the door closed, a trigger operatively mounted upon the housing, means carried by the trigger to engage the bail and hold the door in open position, and a bait holder slidingly mounted in one wall of the housing and adapted to be removably engaged with the trigger to hold the latter in bail engaging position.

3. In an animal trap, a housing open at one end, a door hinged at one edge of the opening, a spring bail extending transversely of the door, a loop pivotally mounted in the door remote from the hinged edge and having its opposite ends pivotally connected with the bail to position the latter above the pivotal mounting of the loop when the door is in closed position, means connecting the bail with the housing to tension said bail when the door is open, a bait holder, and means engaged by the bait holder and engageable by the bail to hold the door in open position.

4. In an animal trap, a housing open at one end, a door hinged at one edge of the opening, a spring bail extending transversely of the door, arms pivotally connecting the door and bail and arranged to position the bail along one edge of the door when the latter is in closed position, a right angled extension on one arm of the bail and having bearings in the housing, means pivotally connecting the other arm of the bail with the right angled extension, means to anchor the extension to the housing to tension the bail when the door is open, a bait holder within the housing, and means engaging the bait holder and engageable with the bail to hold the door in open position.

5. In an animal trap, a housing open at opposite ends, doors having one of their ends hingedly secured to the housing to close the open ends, spring bails connecting the housing and doors and arranged to be tensioned when the doors are in open position, a trigger bar supported for rocking movement on the housing, means carried by the trigger bar to engage both of the bails when the doors are in open position, and a bait holder extending through one wall of the housing and engaging the trigger bar to hold the latter in bail engaging position.

In testimony whereof I affix my signature.

HENRY W. ABEL.